US011008928B2

(12) United States Patent
Smague

(10) Patent No.: US 11,008,928 B2
(45) Date of Patent: May 18, 2021

(54) ENGINE COOLING SYSTEM WITH TWO THERMOSTATS, INCLUDING A CLOSED LOOP IN A RANKINE CYCLE

(71) Applicant: IFP Energies nouvelles, Rueil-Malmaison (FR)

(72) Inventor: Pascal Smague, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/401,144

(22) Filed: May 2, 2019

(65) Prior Publication Data

US 2019/0338693 A1    Nov. 7, 2019

(30) Foreign Application Priority Data

May 4, 2018  (FR) .................................... 18/53.874

(51) Int. Cl.
*F01P 7/16*    (2006.01)
*F01P 3/22*    (2006.01)
*F01P 3/00*    (2006.01)

(52) U.S. Cl.
CPC .................. *F01P 7/16* (2013.01); *F01P 3/22* (2013.01); *F01P 2003/001* (2013.01); *F01P 2050/22* (2013.01)

(58) Field of Classification Search
CPC ......... F01P 7/16; F01P 3/22; F01P 2003/001; F01P 2050/22
See application file for complete search history.

(56) References Cited

FOREIGN PATENT DOCUMENTS

| EP | 1925806 A2 * | 5/2008 | ........... F01K 23/065 |
|----|---|---|---|
| EP | 1925806 A2 | 5/2008 | |
| EP | 2320058 A1 | 5/2011 | |
| EP | 3064734 A1 | 9/2016 | |
| WO | 2014/103820 A1 | 7/2014 | |
| WO | 2016/069455 A1 | 5/2016 | |

OTHER PUBLICATIONS

Sep. 29, 2017, https://web.archive.org/web/20170929071415/http://www.prestone.com/products?detail=AF2000, Prestone, "Instructions" (Year: 2017).*
Jul. 14, 2014, https://docs.lib.purdue.edu/cgi/viewcontent.cgi?article=2523&context=iracc, Purdue University, Purdue e-Pubs, "Comparing R1233zd and R245fa for Low Temperature ORC Applications" (Year: 2014).*
Preliminary Search Report dated Aug. 2, 2018.

* cited by examiner

*Primary Examiner* — Kevin A Lathers
(74) *Attorney, Agent, or Firm* — Fitch, Even, Tabin & Flannery, LLP

(57) ABSTRACT

The present invention relates to a cooling system (1) of an internal-combustion engine. Cooling system (1) comprises a closed cooling loop and it includes a closed loop in a Rankine cycle allowing part of the coolant heat to be recovered. According to the invention, the cooling loop comprises two thermostats (6; 20) and evaporator (19) of the Rankine loop is arranged between the two thermostats (6; 20).

11 Claims, 2 Drawing Sheets

ENGINE COOLING SYSTEM WITH TWO THERMOSTATS, INCLUDING A CLOSED LOOP IN A RANKINE CYCLE

CROSS REFERENCE TO RELATED APPLICATION

Reference is made to French Patent Application No. 18/53.874 filed May 4, 2018, to which priority is claimed and which is incorporated herein by reference in its entirety.

FIELD OF THE INVENTION

The present invention relates to the field of cooling systems of internal-combustion engines. In particular, the invention relates to cooling systems including a closed loop in a Rankine cycle for converting the recovered heat into energy.

BACKGROUND OF THE INVENTION

Internal-combustion engine cooling systems are designed for cooling the internal-combustion engine and possibly its equipments, notably the lubrication system (oil pump), the exhaust gas, the exhaust gas recirculation EGR, etc.

Such systems are generally comprised of a closed loop in which a coolant, notably a mixture of water and ethylene glycol, circulates. Such a closed loop can include a pump, heat exchangers for exchange with the internal-combustion engine and/or its equipments, a thermostat, a radiator and a unit heater. A thermostat is a regulation device comprising at a minimum one inlet and two outlets, the inlet and the outlets are connected according to the opening of an internal valve, whose opening depends on the temperature of the fluid flowing through the thermostat: when the fluid temperature is below a threshold, only one outlet is connected to the inlet, and when the fluid temperature is greater than or equal to this threshold, both outlets are connected to the inlet.

FIG. 1 schematically illustrates an example of a simplified cooling system according to the prior art. Cooling system 1 comprises a pump 2. Pump 2 is connected to the crankcase and to the cylinder head of internal-combustion engine 3, to lubrication system 4 and to exhaust gases 5 through a line 10. Cooling of internal-combustion engine 3 and cooling of lubrication system 4 are arranged in parallel in the cooling loop, and this assembly is arranged in series, through a line 11, with the heat exchanger for exchange with exhaust gas 5 or the EGR gas exchanger when there is one. At the outlet of these heat exchangers, line 12 is connected to a thermostat 6.

Outlet 17 of thermostat 6 is connected to a unit heater 8 by means of a line 13. The fluid at the outlet of unit heater 8 circulates towards pump 2. Outlet 17 is the outlet of thermostat 6 always connected to the inlet of thermostat 6.

Outlet 18 of thermostat 6 is connected to a radiator 7 by means of a line 15. The fluid at the outlet of radiator 7 circulates towards pump 2. Outlet 18 is the outlet of thermostat 6 connected to the inlet of thermostat 6 when the fluid temperature at the inlet of thermostat 6 is greater than or equal to a predetermined threshold.

For such a cooling system, the heat (and therefore the energy) recovered by the coolant is lost.

In order to recover part of this lost energy, it was envisaged to include a closed-loop Rankine cycle into the cooling system.

As is widely known, a Rankine cycle is a thermodynamic cycle wherein heat coming from an external heat source is transmitted to a closed loop containing a fluid (referred to as working fluid or heat carrier fluid).

This type of cycle is generally broken up into a stage where the working fluid used in liquid form is compressed in an isentropic manner, followed by a stage where this compressed liquid fluid is heated and vaporized on contact with a heat source.

This vapour is then expanded, in another stage, in an isentropic manner in an expansion machine, then, in a last stage, this expanded vapour is cooled and condensed on contact with a cold source.

To carry out these various stages, the loop generally comprises a compressor pump for circulating and compressing the fluid in liquid form, an evaporator that is swept by a hot fluid for at least partial vaporization of the compressed fluid, an expansion machine for expanding the vapour, such as a turbine that converts the energy of this vapour into another energy such as mechanical or electrical energy, and a condenser by means of which the heat contained in the vapour is yielded to a cold source, generally outside air that sweeps this condenser, so as to convert this vapour into a fluid in liquid form.

In the field of internal-combustion engines, conventional Rankine cycles consist in inserting a heat carrier fluid loop for recovery of the engine heat losses. In general, this recovery is performed on the exhaust gases/the EGR (exhaust gas recirculation) gases, or on the cooling loop, or on both simultaneously.

When this recovery is performed on the cooling system, the Rankine cycle evaporator enables heat exchange between the coolant and the heat carrier fluid of the Rankine cycle. The evaporator can generally be arranged on the recirculation branch of the cooling loop upstream from the thermostat, so as not to disrupt the engine temperature regulation.

Under such conditions, recovery needs to be controlled, notably with a cold internal-combustion engine, in order not to penalize warm-up of the engine, likely to affect the efficiency thereof by degrading consumption and pollutant emissions during this phase. Once the internal-combustion engine warm, the thermostat arranged downstream from the Rankine loop exchanger sends back to the radiator the excess calories of the cooling loop that have not been drawn by the Rankine cycle. By comparison with an operation without a Rankine cycle, the engine thermostat thus allows passage of fewer calories towards the engine radiator.

With this type of cooling loop architecture, the temperature of the engine coolant entering the Rankine exchanger is not regulated, and this temperature may fluctuate significantly, notably if the coolant is heated at the engine outlet by an exchanger on the exhaust. In this case, suitable pressure and temperature conditions are not guaranteed for the heat carrier fluid of the Rankine cycle loop, in particular for transient operation of the internal-combustion engine.

Alternatively, the Rankine cycle evaporator may be arranged downstream from the engine thermostat, on the branch towards the radiator, so as to guarantee stable temperature conditions for the engine coolant entering the Rankine evaporator in order to simplify the regulation of the heat carrier fluid flow rate in the Rankine cycle. Under such conditions, the coolant is excessively cooled by the evaporator and the radiator mounted in series, which causes a drop in the flow rate in the branch towards the radiator and therefore generates a decrease in the energy recovered by the Organic Rankine Cycle ORC (Rankine cycle using an organic fluid).

Patent applications WO-2014/103,820 and EP-3,064,734 describe cooling system embodiments including a closed loop in a Rankine cycle.

Patent application WO-2014/103,820 illustrates a cooling loop wherein, for the Rankine cycle, the evaporator is arranged between a heat exchanger for exchange with the exhaust gas and expansion means. For this cooling loop, the coolant can be excessively cooled by the evaporator and the condenser (radiator), which may lead to a drop in the flow rate in the thermostat-controlled branch and therefore to a decrease in the recovered energy.

Patent application EP-3,064,734 discloses a cooling system wherein a radiator and a sub-radiator are used for cooling the coolant prior to heat exchange in the evaporator. Thus, the amount of heat recovered by the Rankine cycle is limited because part of the heat is previously dissipated in the radiators.

To overcome these drawbacks, the present invention relates to a cooling system for an internal-combustion engine. The cooling system comprises a closed cooling loop and it includes a closed loop in a Rankine cycle, which allows part of the coolant heat to be recovered. According to the invention, the cooling loop comprises two thermostats and the evaporator of the Rankine loop is arranged between the two thermostats. This layout allows the coolant temperature in the evaporator to be regulated, which promotes energy recovery by the Rankine cycle. Furthermore, this layout allows to optimize cooling of the internal-combustion engine and to simplify supervision of the loop in the Rankine cycle. Besides, this cooling system design requires few modifications in relation to a cooling system without a Rankine cycle loop.

SUMMARY OF THE INVENTION

The invention relates to a cooling system of an internal-combustion engine comprising a closed cooling loop in which a coolant circulates, said cooling loop comprises at least one cooling loop pump, at least one heat exchanger for exchange with an element or an equipment of said internal-combustion engine, a first thermostat and a cooling loop radiator, said cooling system further comprising a closed loop in a Rankine cycle in which a working fluid circulates, said loop in said Rankine cycle comprising at least one Rankine loop pump, an evaporator for heat exchange between said coolant and said working fluid, at least one turbine and at least one Rankine loop condenser. Said cooling loop comprises a second thermostat and, within said cooling loop, said evaporator is connected to an outlet of said first thermostat and to an inlet of said second thermostat.

According to an embodiment of the invention, said cooling loop further comprises a unit heater connected to an outlet of said first thermostat distinct from the outlet of said first thermostat connected to said evaporator.

According to an implementation of the invention, said Rankine loop condenser is arranged next to said radiator of the cooling loop.

According to an aspect, said Rankine loop condenser exchanges heat with a low-temperature cooling loop.

Advantageously, said element or said equipment of said internal-combustion engine is selected from among the crankcase of said internal-combustion engine and/or the lubrication system and/or the exhaust gas system and/or the exhaust gas recirculation system.

Advantageously, said coolant is water or a 20 to 50% by volume mixture of ethylene glycol and water.

Preferably, said working fluid is selected from among a fluid of formula $CF_3CF_2C(O)CF(CF_3)_2$, R1233ZD or R245fa (1,1,1,3,3-Pentafluoropropane).

According to an embodiment, the temperature threshold of said second thermostat is calibrated at a temperature less than or equal to the temperature threshold of said first thermostat.

According to an implementation, the temperature thresholds of said first and second thermostats are controlled so as to dynamically change the temperature regulation curve thereof according to the load of said internal-combustion engine.

Furthermore, the invention relates to a method of controlling a cooling system according to one of the above characteristics, wherein the following stages are carried out:

a) when the temperature of said coolant at the inlet of said first thermostat is below a predetermined threshold, said first thermostat prevents circulation of said coolant in said evaporator, b) when the temperature of said coolant at the inlet of said first thermostat is greater than or equal to a predetermined threshold, said first thermostat enables circulation of said coolant in said evaporator, and i) when the temperature of said coolant at the inlet of said second thermostat is below a predetermined threshold, said second thermostat prevents circulation of said coolant in said cooling radiator, ii) when the temperature of said coolant at the inlet of said second thermostat is greater than or equal to a predetermined threshold, said second thermostat enables circulation of said coolant in said cooling radiator.

Besides, the invention relates to a vehicle comprising an internal-combustion engine and a cooling system according to one of the above characteristics.

BRIEF DESCRIPTION OF THE FIGURES

Other features and advantages of the system according to the invention will be clear from reading the description hereafter of embodiments given by way of non-limitative examples, with reference to the accompanying figures wherein.

DETAILED DESCRIPTION OF THE INVENTION

Figure 1:
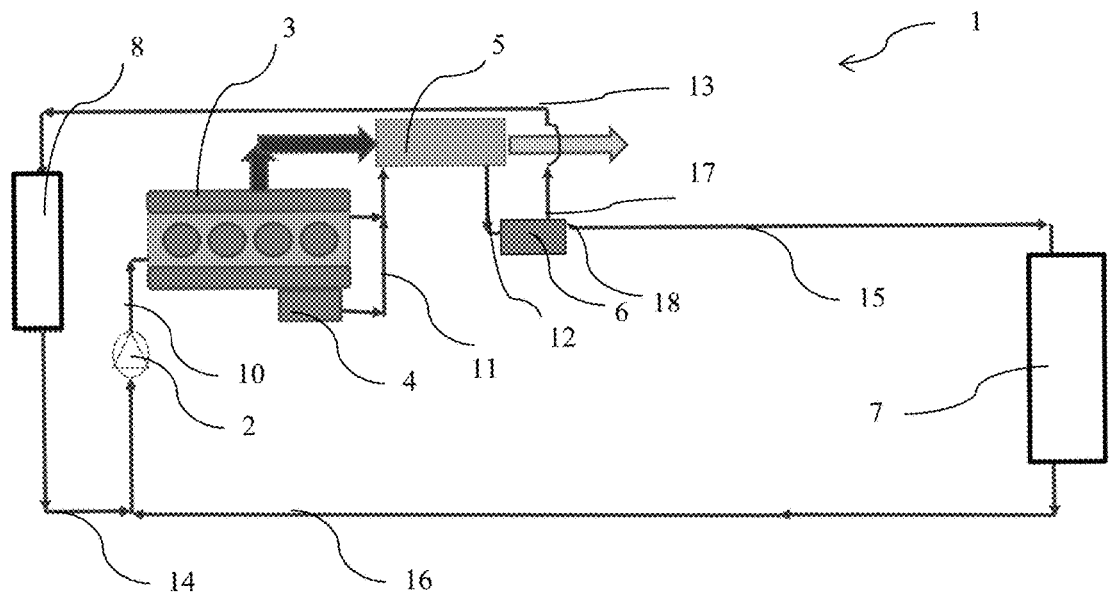
FIG. 1, already described, illustrates a cooling system according to the prior art.

The present invention relates to a cooling system of an internal-combustion engine whose purpose is to cool the internal-combustion engine and/or at least one of the equipments thereof.

According to the invention, the cooling system comprises:
a closed cooling loop (referred to as cooling loop) in which a coolant circulates, with:
  at least one cooling loop pump (referred to as cooling pump) providing circulation of the coolant in the cooling loop,
  at least one heat exchanger for exchange between the coolant and at least one element or equipment of the internal-combustion engine, thus the coolant recovers heat from the internal-combustion engine or one of its equipments, a first thermostat comprising an inlet and two outlets, where the inlet and the outlets are connected according to the opening of an internal valve whose opening depends on the temperature of the fluid flowing through the first thermostat: when the fluid temperature is below a threshold, only one outlet is connected to the inlet, and when the fluid temperature is greater than or equal to this threshold, both outlets are connected to the inlet, the inlet of the first thermostat being connected to the outlet of the heat exchanger(s), a cooling loop radiator (referred to as cooling radiator) that cools the coolant by heat exchange with a cold source (a vehicle radiator for example in the case of a cooling system aboard a vehicle) and whose outlet is connected to the cooling loop pump, a closed loop in a Rankine cycle (referred to as Rankine loop) for converting the heat recovered by the coolant into mechanical or electrical energy, a working fluid (or heat carrier fluid) circulates in the Rankine loop with, in this order:

a Rankine loop pump (referred to as Rankine pump) that compresses the working fluid, an evaporator enabling heat exchange between the working fluid and the coolant, in order to achieve evaporation of the working fluid through the heat of the coolant, this evaporator is arranged in the cooling loop at the outlet of the first thermostat that is open when the fluid temperature is greater than a predetermined threshold, a turbine that converts the heat into electrical or mechanical energy, a Rankine loop condenser (referred to as Rankine condenser) that condenses the working fluid by heat exchange with a cold source (for example a vehicle radiator in the case of a cooling system aboard a vehicle) before passage through the Rankine loop pump.

According to the invention, the closed cooling loop further comprises a second thermostat and, within the cooling loop, the evaporator is connected, on the one hand, to an outlet of the first thermostat and, on the other hand, to the inlet of the second thermostat. In other words, the evaporator is arranged between the two thermostats. This configuration enables regulation of the coolant temperature in the evaporator, which promotes energy recovery by the Rankine cycle. Furthermore, this layout allows to optimize cooling of the internal-combustion engine and to simplify supervision of the Rankine cycle loop.

The second thermostat comprises an inlet and two outlets. In the second thermostat, the inlet and the outlets are connected according to the opening of an internal valve, whose opening depends on the temperature of the fluid flowing through the second thermostat: when the fluid temperature is below a threshold, only one outlet is connected to the inlet, and when the fluid temperature is greater than or equal to this threshold, both outlets are connected to the inlet. A first outlet of the second thermostat (the one that is always connected to the inlet of the second thermostat) is connected to the inlet of the cooling loop pump. A second outlet of the second thermostat (the one connected to the inlet of the second thermostat when the coolant temperature exceeds the threshold) is connected to the cooling loop radiator.

According to an embodiment of the invention, the cooling loop can further comprise a unit heater. A unit heater is a heat exchanger between the coolant of the internal-combustion engine and pulsed air in the vehicle passenger compartment. The unit heater can be connected to an outlet of the first thermostat, this outlet being distinct from the outlet of the first thermostat connected to the evaporator. It can be the outlet of the first thermostat that is always connected to the inlet of the first thermostat. The outlet of the unit heater can be connected to the inlet of the cooling loop pump.

This layout enables an internal-combustion engine temperature rise under engine warm-up conditions after a cold start. Under such conditions, the first thermostat is closed and the Rankine cycle is therefore not in operation.

In the case of an on-board application of the cooling device in a vehicle, the unit heater can be used for heating the passenger compartment. Thus, part of the heat recovered is used for heating the vehicle, which limits energy losses. Furthermore, this makes it possible to start heating the passenger compartment as soon as the vehicle is started.

In a variant, the outlet of the first thermostat always connected to the inlet thereof is directly connected to the cooling pump.

According to an implementation of the invention, the Rankine loop condenser can be arranged next to the cooling loop radiator. This configuration enables a simplified condensation means design, in particular in the case of an on-board application of the cooling device in a vehicle where the condensers can be grouped together next to the vehicle radiator. In this case, other vehicle condensers, an air conditioning condenser for example, can also be provided next to the two exchangers.

Alternatively, the Rankine loop condenser can exchange heat with a low-temperature cooling loop in which a low-temperature fluid circulates between the Rankine loop condenser and a low-temperature radiator. In this case, the low-temperature cooling loop can comprise a low-temperature radiator arranged next to the cooling loop radiator. The low-temperature cooling loop can also be a cooling loop of a battery or of a power electronics device present in a hybrid vehicle.

The internal-combustion engine element or equipment cooled by the coolant can be selected from among:
    the internal-combustion engine crankcase, and/or
    the internal-combustion engine lubrication system, for example the oil pump of this lubrication system, and/or
    the exhaust gas system, and/or
    the exhaust gas recirculation (EGR) system, and/or
    any heat-producing element.

According to an implementation of the invention, at least the internal-combustion engine crankcase can be cooled by the cooling system.

According to an example embodiment, the cooling loop can comprise a heat exchanger for heat exchange with the internal-combustion engine crankcase, a heat exchanger for heat exchange with the lubrication system and a heat exchanger for heat exchange with the exhaust gas (with or without exhaust gas recirculation). In this case, heat exchanges between the coolant and the internal-combustion engine crankcase and the lubrication system can occur simultaneously (in parallel), and the heat exchange with the exhaust gas can occur successively after these first heat exchanges (in series). This configuration enables cooling of these elements to be optimized.

According to an aspect of the invention, the coolant is water or a 20 to 50% by volume mixture of ethylene glycol and water.

Advantageously, the working fluid (or heat carrier fluid) is a low boiling point refrigerant compatible with an organic Rankine cycle ORC recovering heat at around 90° C., such as:
- a fluid of formula $CF_3CF_2C(O)CF(CF_3)_2$, for example a NOVEC 649™ type fluid (marketed by the 3M Company),
- a fluorinated gas of the hydrofluoro-olefin family, R1233ZD for example, or
- 1,1,1,3,3-Pentafluoropropane, also known as R245fa.

According to an embodiment of the invention, the temperature threshold of the second thermostat can be calibrated at a temperature less than or equal to the temperature threshold of the first thermostat. This calibration allows optimum regulation of the coolant temperature in the evaporator, and therefore optimized energy recovery.

The temperature thresholds of the thermostats are determined notably according to the thermal management strategy selected for the engine. For example, the temperature threshold of the first thermostat can range between 85° C. and 95° C., and the temperature threshold of the second thermostat can range between 80° C. and 90° C.

Advantageously, the temperature thresholds of the thermostats can be controlled so as to dynamically change the temperature regulation curve thereof according to the load of the internal-combustion engine and according to the recovery strategy of the Rankine cycle loop. This dynamic calibration provides a good compromise between cooling of the internal-combustion engine and energy recovery by the Rankine cycle loop.

Figure 2:
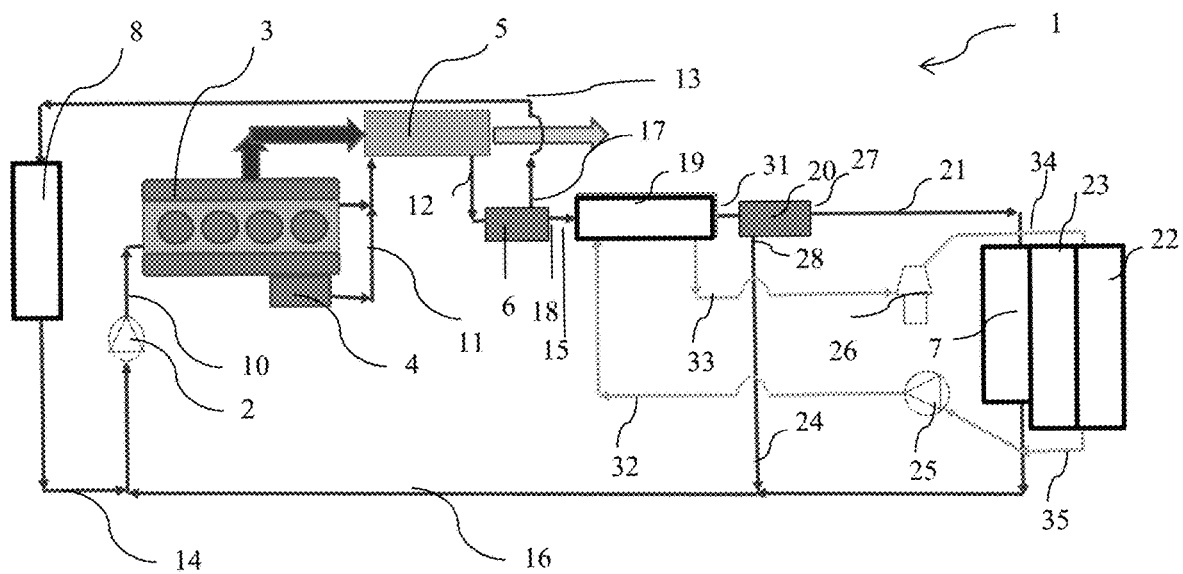
FIG. 2 illustrates a cooling system according to a first embodiment of the invention.

FIG. 2 schematically illustrates, by way of non-limitative example, a cooling system according to a first embodiment of the invention.

Cooling system 1 comprises a cooling loop in which a coolant circulates. The circulation of the coolant is illustrated by black arrows. The cooling loop comprises a cooling pump 2. Cooling pump 2 is connected to heat exchangers linked to internal-combustion engine 3, lubrication system 4 and exhaust gas 5 by a line 10. The heat exchangers of internal-combustion engine 3 and of lubrication system 4 are arranged in the cooling loop in parallel, and this assembly is arranged in series with the exchanger exchanging heat with exhaust gas 5 through a line 11. At the outlet of these heat exchangers, line 12 is connected to a first thermostat 6.

Outlet 17 of first thermostat 6 is connected to a unit heater 8 by a line 13. The fluid at the outlet of unit heater 8 circulates towards pump 2. Outlet 17 is the outlet of first thermostat 6 that is always connected to the inlet of first thermostat 6.

Outlet 18 of first thermostat 6 is connected to an evaporator 19 through a line 15. Outlet 18 is connected to the inlet of first thermostat 6 only when the coolant at the inlet of first thermostat 6 has a temperature greater than or equal to the temperature threshold of first thermostat 6. At the outlet of evaporator 19, the coolant is sent to a second thermostat 20 through a line 31.

Outlet 28 of second thermostat 20 is connected to pump 2 by a line 24 and a line 16. Outlet 28 is the outlet of second thermostat 20 that is always connected to the inlet of second thermostat 20.

Outlet 27 of second thermostat 20 is connected to a radiator 7 of the cooling loop by a line 21. The outlet of radiator 7 of the cooling loop is connected to cooling pump 2 by line 16.

Thus, the cooling loop comprises three branches at the outlet of the heat exchangers exchanging heat with the engine elements or equipments: the branch with unit heater 8 at the outlet of first thermostat 6, the return branch to cooling pump 2 at the outlet of second thermostat 20 and the branch with radiator 7 of the cooling loop at the outlet of second thermostat 20.

Cooling system 1 further comprises a closed loop in a Rankine cycle, in which a working fluid circulates. The working fluid circulation is illustrated by grey arrows. The Rankine cycle closed loop comprises a Rankine loop pump 25. Rankine loop pump 25 is connected to evaporator 19 by a line 32. In evaporator 19, the coolant and the working fluid exchange heat so as to cool the coolant and to heat the working fluid. The outlet of evaporator 19 is connected to a turbine 26 by a line 33. Turbine 26 converts the heat into mechanical or electrical energy. The outlet of turbine 26 is connected to a Rankine loop condenser 22 by a line 34. At the outlet of Rankine loop condenser 22, the working fluid circulates, in liquid form, towards Rankine loop pump 25 through a line 35.

For this first embodiment, Rankine loop condenser 22 is arranged next to cooling radiator 7. For the configuration illustrated, an additional condenser 23, an air conditioning condenser for example, is interposed between Rankine loop condenser 22 and cooling radiator 7.

Figure 3:
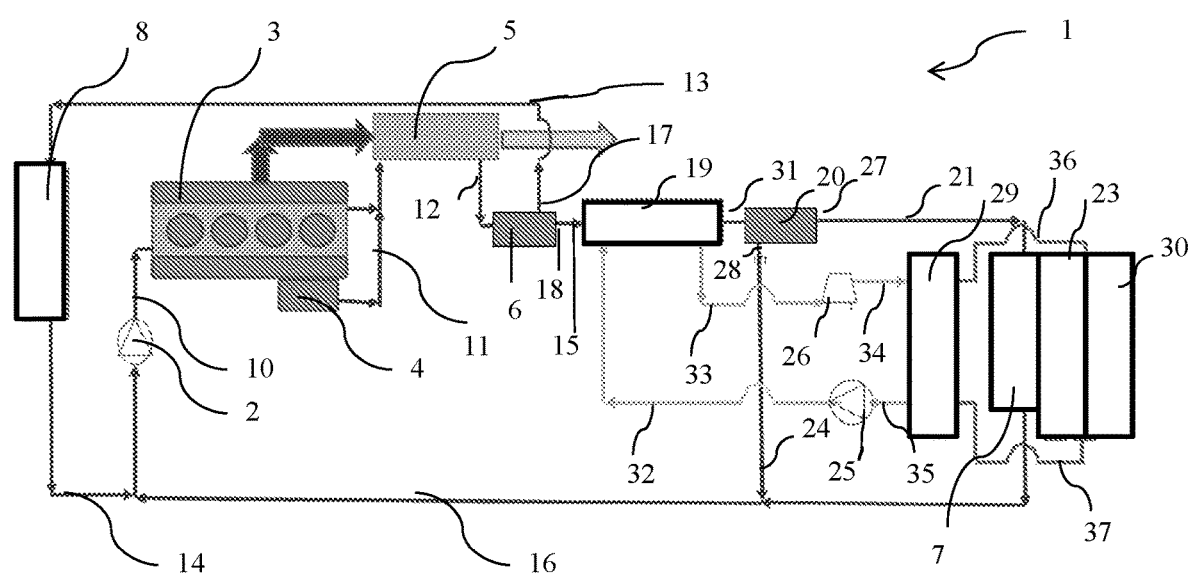
FIG. 3 illustrates a cooling system according to a second embodiment of the invention.

FIG. 3 schematically illustrates, by way of non-limitative example, a cooling system according to a second embodiment of the invention.

Cooling system 1 comprises a cooling loop in which a coolant circulates. The circulation of the coolant is illustrated by black arrows. The cooling loop comprises a cooling pump 2. Cooling pump 2 is connected to heat exchangers linked to internal-combustion engine 3, lubrication system 4 and exhaust gas 5 by a line 10. The heat exchangers of internal-combustion engine 3 and of lubrication system 4 are arranged in the cooling loop in parallel, and this assembly is arranged in series with the exchanger exchanging heat with exhaust gas 5 by a line 11. At the outlet of these heat exchangers, line 12 is connected to a first thermostat 6.

Outlet 17 of first thermostat 6 is connected to a unit heater 8 by a line 13. The fluid at the outlet of unit heater 8 circulates towards pump 2. Outlet 17 is the outlet of first thermostat 6 that is always connected to the inlet of first thermostat 6.

Outlet 18 of first thermostat 6 is connected to an evaporator 19 through a line 15. Outlet 18 is connected to the inlet of first thermostat 6 only when the coolant at the inlet of first thermostat 6 has a temperature greater than or equal to the temperature threshold of first thermostat 6. At the outlet of evaporator 19, the coolant is sent to a second thermostat 20 through a line 31.

Outlet 28 of second thermostat 20 is connected to pump 2 by a line 24 and a line 16. Outlet 28 is the outlet of second thermostat 20 that is always connected to the inlet of second thermostat 20.

Outlet 27 of second thermostat 20 is connected to a radiator 7 of the cooling loop by a line 21. The outlet of radiator 7 is connected to cooling pump 2 by line 16.

Thus, the cooling loop comprises three branches at the outlet of the heat exchangers exchanging heat with the engine elements or equipments: the branch with unit heater 8 at the outlet of first thermostat 6, the return branch to cooling pump 2 at the outlet of second thermostat 20 and the branch with radiator 7 of the cooling loop at the outlet of second thermostat 20.

Cooling system 1 further comprises a closed loop in a Rankine cycle, in which a working fluid circulates. The working fluid circulation is illustrated by light grey arrows. The Rankine cycle closed loop comprises a Rankine loop pump 25. Rankine loop pump 25 is connected to evaporator 19 by a line 32. In evaporator 19, the coolant and the working fluid exchange heat so as to cool the coolant and to heat the working fluid. The outlet of evaporator 19 is connected to a turbine 26 by a line 33. Turbine 26 converts the heat into mechanical or electrical energy. The outlet of turbine 26 is connected to a Rankine loop condenser 29 by a line 34. At the outlet of Rankine loop condenser 29, the working fluid circulates, in liquid form, towards Rankine loop pump 25 through a line 35.

For this second embodiment, Rankine loop condenser 29 exchanges heat with a low-temperature loop in which a low-temperature fluid circulates. The low-temperature fluid circulation is illustrated by dark grey arrows. The low-temperature fluid circulates through lines 36 and 37 between Rankine loop condenser 29, in which it recovers heat, and a low-temperature radiator 30 in which it is cooled.

Low-temperature radiator 30 is arranged next to cooling radiator 7. For the configuration illustrated, an additional condenser 23, an air conditioning condenser for example, is interposed between low-temperature loop radiator 30 and cooling radiator 7.

Furthermore, the present invention relates to a method of controlling a cooling system according to one of the variants or variant combinations described above. For this method, the following stages are carried out:

a) when the temperature of the coolant at the inlet of the first thermostat is below a first predetermined temperature threshold, the first thermostat prevents circulation of the coolant in the evaporator, thus the coolant circulates only in the branch comprising the unit heater, b) when the temperature of the coolant at the inlet of the first thermostat is greater than or equal to the first predetermined temperature threshold, the first thermostat enables circulation of the coolant in said evaporator (the coolant circulates in the branch comprising the unit heater and in the return branch to the pump at the outlet of the second thermostat), and
  i) when the temperature of the coolant at the inlet of the second thermostat is below a second predetermined temperature threshold, the second thermostat prevents circulation of the coolant in said cooling radiator (the coolant circulates in the branch comprising the unit heater and in the return branch to the pump at the outlet of the second thermostat),
  ii) when the temperature of the coolant at the inlet of the second thermostat is greater than or equal to the second predetermined temperature threshold, the second thermostat enables circulation of the coolant in the cooling radiator (the coolant circulates in the branch comprising the unit heater, in the return branch to the pump at the outlet of the second thermostat and in the branch comprising the cooling radiator).

Thus, by means of this control method, the cooling device reacts as follows:

under internal-combustion engine warm-up conditions after a cold start, the coolant flows through the heat exchangers (for example from the internal-combustion engine, the water/oil exchanger of the lubrication system, then into the exhaust gas recirculation EGR loop) and the unit heater to allow fast engine temperature rise, possibly limitation of friction within the engine (case of heat exchange with the lubrication system), and possibly heating of the passenger compartment (case of the on-board device application). This warm-up can be improved by an exchanger that recovers the exhaust or the EGR energy: warm-up function of the internal-combustion engine. On the other hand, the part of the loop downstream from the first thermostat connected to the Rankine recovery cycle is inactive, when the temperature at the engine outlet reaches a given value (first temperature threshold) set by calibration of thermostat 1 (89° C. for example), the latter opens progressively and allows passage of part of the coolant towards the second part of the cooling loop containing the Rankine evaporator at the regulated temperature set by the first thermostat. Depending on the engine speed and load level, only the flow rate of the engine coolant in this loop of the system changes, thus simplifying regulation of the Rankine cycle heat carrier fluid. Under such operating conditions, the second thermostat downstream from the Rankine loop evaporator is closed, considering the decrease in temperature of the coolant flowing through the evaporator. The heat carrier fluid thus cooled by the evaporator is sent back to the cooling pump without passing through the engine cooling radiator. Under such conditions, coolant overcooling at the internal-combustion engine inlet, likely to interfere with the Rankine cycle recovery and optimum engine operation, is thus prevented, when the power to be evacuated in the engine cooling system exceeds a given threshold above the recovery capacity of the Rankine cycle evaporator (that can be calibrated by the definition of the turbine and the evaporator), the evaporator outlet temperature increases, and this increase causes opening of the second thermostat downstream from the evaporator (because the coolant temperature becomes greater than or equal to the second temperature threshold of the second thermostat), which sends part of the coolant stream to the engine cooling radiator allowing to evacuate the surplus calories that have not been recovered by the Rankine cycle.

Besides, the invention relates to a vehicle comprising an internal-combustion engine and a cooling device according to one of the variants or one of the variant combinations described above.

The vehicle can notably be a motor vehicle or a heavy vehicle.

The internal-combustion engine according to the invention can be used in the field of on-board applications, such as the fields of road, marine or air transport, or in the field of stationary installations, such as a generator set.

The invention claimed is:

1. A cooling system of an internal-combustion engine comprising:
  a closed cooling loop in which a coolant circulates, the cooling loop comprises at least one cooling loop pump, at least one heat exchanger for exchange with an element or an equipment of the internal-combustion engine, a first thermostat and a cooling loop radiator,
  the cooling system further comprising a closed loop in a Rankine cycle in which a working fluid circulates, the loop in the Rankine cycle comprising at least one Rankine loop pump, an evaporator for heat exchange between the coolant and the working fluid, at least one turbine and at least one Rankine loop condenser,
  wherein the cooling loop comprises a second thermostat and in that, within the cooling loop, the evaporator is connected to an outlet of the first thermostat and to an inlet of the second thermostat, wherein each of the first and second thermostats is a regulation device comprising at least one input and two outputs, the at least one input and the two outputs being connected according to opening of an internal valve, the opening of which depends on the temperature of the fluid passing through the first and second thermostats such that when a temperature of the fluid is below a threshold, only one output is connected to the at least one input, and when the fluid temperature is greater than or equal to the threshold, the two outputs are connected to the at least one input, and wherein the temperature thresholds of the first and second thermostats can be controlled so as to dynamically change the temperature regulation curve thereof according to the load of the internal-combustion engine.

2. A cooling system as claimed in claim 1, wherein the cooling loop further comprises a unit heater connected to an outlet of the first thermostat distinct from outlet of the first thermostat connected to the evaporator.

3. A cooling system as claimed in claim 1, wherein the Rankine loop condenser is arranged next to the cooling loop radiator.

4. A cooling system as claimed in claim 1, wherein the Rankine loop condenser exchanges heat with a low-temperature cooling loop.

5. A cooling system as claimed in claim 1, wherein the element or the equipment of the internal-combustion engine is selected from among the crankcase of the internal-combustion engine and/or lubrication system and/or exhaust gas system and/or the exhaust gas recirculation system.

6. A cooling system as claimed in claim 1, wherein the coolant is water or a 20 to 50% by volume mixture of ethylene glycol and water.

7. A cooling system as claimed in claim 1, wherein the working fluid is selected from among a fluid of formula $CF_3CF_2C(O)CF(CF_3)_2$, R1233ZD or R245fa (1,1,1,3,3-Pentafluoropropane).

8. A cooling system as claimed in claim 1, wherein the temperature threshold of the second thermostat is calibrated at a temperature less than or equal to the temperature threshold of the first thermostat.

9. A method of controlling a cooling system as claimed in claim 1, wherein the following stages are carried out:
   a) when the temperature of the coolant at the inlet of the first thermostat is below a predetermined threshold, the first thermostat prevents circulation of the coolant in the evaporator,
   b) when the temperature of the coolant at the inlet of the first thermostat is greater than or equal to a predetermined threshold, the first thermostat enables circulation of the coolant in the evaporator, and
   i) when the temperature of the coolant at the inlet of the second thermostat is below a predetermined threshold, the second thermostat prevents circulation of the coolant in the cooling radiator,
   ii) when the temperature of the coolant at the inlet of the second thermostat is greater than or equal to a predetermined threshold, the second thermostat enables circulation of the coolant in the cooling radiator;

wherein the temperature thresholds of the first and second thermostats are controlled so as to dynamically change the temperature regulation curve thereof according to the load of the internal-combustion engine.

10. A vehicle comprising an internal-combustion engine and the cooling system as claimed in claim 1.

11. A cooling system of an internal-combustion engine capable of being used with a hybrid vehicle, comprising:
   a closed cooling loop in which a coolant circulates, the cooling loop comprises at least one cooling loop pump, at least one heat exchanger for exchange with an element or an equipment of the internal-combustion engine, a first thermostat and a cooling loop radiator,
   the cooling system further comprising a closed loop in a Rankine cycle in which a working fluid circulates, the loop in the Rankine cycle comprising at least one Rankine loop pump, an evaporator for heat exchange between the coolant and the working fluid, at least one turbine and at least one Rankine loop condenser, wherein the Rankine loop condenser exchanges heat with a low-temperature cooling loop,
   wherein the cooling loop comprises a second thermostat and in that, within the cooling loop, the evaporator is connected to an outlet of the first thermostat and to an inlet of the second thermostat, wherein each of the first and second thermostats is a regulation device comprising at least one input and two outputs, the at least one input and the two outputs being connected according to opening of an internal valve, the opening of which depends on the temperature of the fluid passing through the first and second thermostats such that when a temperature of the fluid is below a threshold, only one output is connected to the at least one input, and when the fluid temperature is greater than or equal to the threshold, the two outputs are connected to the at least one input and
   wherein the low temperature cooling loop further comprises a cooling loop of a battery or power electronics.

* * * * *